Sept. 3, 1940.  W. W. ROWE  2,213,290
PROCESS OF MAKING STRETCHABLE MATERIALS AND ARTICLES
Filed Jan. 25, 1937  2 Sheets-Sheet 1

INVENTOR.
WILLIAM WALLACE ROWE.
BY Allen + Allen
ATTORNEYS.

Sept. 3, 1940.  W. W. ROWE  2,213,290

PROCESS OF MAKING STRETCHABLE MATERIALS AND ARTICLES

Filed Jan. 25, 1937  2 Sheets-Sheet 2

INVENTOR.
WILLIAM WALLACE ROWE.
BY Allen & Allen
ATTORNEYS.

Patented Sept. 3, 1940

2,213,290

UNITED STATES PATENT OFFICE 2,213,290

PROCESS OF MAKING STRETCHABLE MATERIALS AND ARTICLES

William Wallace Rowe, Cincinnati, Ohio, assignor to The Paper Service Company, Lockland, Ohio, a corporation of Ohio Application January 25, 1937, Serial No. 122,172

15 Claims. (Cl. 93—94)

My invention relates especially to webs of material and to articles made of such webs, for example, bags, bag tubes, blanks for bags, binding strips and the like, which webs and articles have stretchability in one or more directions, particularly allocated to the various uses to which the articles of webs are to be put.

In a copending application Serial No. 664,377 filed April 4, 1933, I have described and claimed certain bags for heavy duty embodying a new principle. These bags do not rely upon the ultimate bursting strength of the materials employed in them for their serviceability. On the contrary, their extraordinary serviceability is derived from the ability of the materials of which the bags are made to absorb the shocks and strains of use by a stretching or distortion of the body materials. By way of example, such bags, as described in that case may be made of a plurality of layers of universally stretchable paper cemented together. When such bags are filled with suitable contents and are subjected to the shocks and strains of use, such as dropping them while loaded, the shocks are absorbed by distortions of the bag walls, and the resistance of the bags to such shocks is surprising and extraordinary.

I have found that in bags, for example, the fundamental necessity is lateral stretchability as respects the bag, and in some instances longitudinal stretchability also. Universal stretchability, i. e. the ability to expand or distort in every direction is not in many instances required. Therefore, in accordance with the teachings of the present invention, I am enabled by means, a structure and a method hereinafter set forth, to make webs and bags and other articles out of materials which have a major or primary stretchability in but one direction and still gain the desired effect. I am also enabled to use reenforcements, the elements of which are not in themselves essentially stretchable, and gain the desired effects by a suitable placement of the reenforcing elements, in conjunction with the use of universally stretchable webs or combinations of webs which have but one direction of major or primary stretchability.

Taking creped paper as an example of a stretchable web, it will be understood that the paper is stretchable to the greatest extent in a direction perpendicular to the lines of creping therein. This is what I mean by the terms "major or primary stretchability", as distinguished, of course, from that restricted stretchability which can be had along lines transverse to but not perpendicular to the lines of creping, and as distinguished from that substantial lack of stretchability which is found in single creped papers parallel to or along the lines of the creping. What has been said of creped papers, of course, will apply also to paper webs or other webs characterized by other sets of gatherings or rugosities which impart a certain stretchability to the webs, and will apply also to inherently stretchable webs.

The general objects of my invention will be apparent from the above or will be clear to one skilled in the art upon reading the following specifications. I accomplish these objects in those certain webs of material, bags or other articles made therefrom, and by the particular processes of making webs, bags or articles, of which I shall now describe certain preferred embodiments.

In the drawings:

Figures 1 to 5 inclusive, are illustrative of webs, bag or container blanks or materials from which such blanks may be made. In these figures the arrows indicate the longitudinal and lateral axes of the webs and also directions of stretchability in the webs. In these illustrations the webs have been separated into layers to show their construction.

Figure 1:
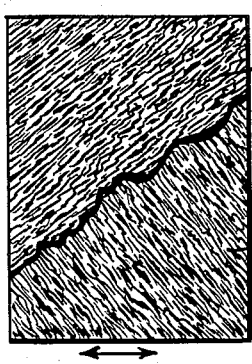

Taking bags as exemplary articles formed in accordance with my invention, I have found, as indicated, that lateral and longitudinal stretchability or distortability of the articles are the primary requisites. In use, bags are frequently subjected to end drops, and such drops for a given or constant height are the most severe, because of the relatively tall vertical column of material. On side drops there is less relative strain because the contents of the bag do not have a great head, i. e. the depth of the contents is not great in the vertical direction. Stretchability or distortability in these two directions, however, is important; and it may be attained in bags otherwise similar in spirit to the bags of my copending application above referred to. William C. Kemp, in his copending application Serial No. 558,884, filed Aug. 24, 1931, has disclosed a web of paper and a process of making it whereby the paper is creped along lines not conforming with either axis of the web but lying at an angle to both. Such paper, when creped in but one direction, has essentially one major or primary direction of stretch as hereinabove defined; but by reason of the fact that the lines of creping lie aslant to the axes of the web, there is a considerable degree of stretchability along the lateral and longitudinal axes of the web. A bag or liner made of such single-diagonally creped paper has an effective stretchability, therefore, both laterally and longitudinally; but if used without other support, there is a tendency for the bag or liner to twist as strain is applied to it, in such a way as to remove the stretchability. I have found, however, that a very serviceable bag having the characteristics of bags described in my copending application above referred to, can be made if two sheets of single-diagonally creped paper are used together in such a way that the diagonal lines of creping in one sheet are arranged in a direction substantially opposite to the direction of the lines of creping in the other sheet. This is illustrated in Fig. 1 where I have shown a sheet or web 1, of single-diagonally creped paper superposed upon another sheet or web 2, of the same character of paper, the webs, however, being so superposed that the lines of creping cross each other. A bag, container or article made in the usual way from such a composite fabric has stretchability along both the lateral and longitudinal axes, and is capable of stretching or distorting under the strains of use but without any tendency toward twisting, as set forth above. It will be clear that the tendency of one sheet to cause the article to twist will be counteracted by the opposite tendency of the other sheet. Both sheets can stretch together along the lateral and longitudinal axes of the web (which are the directions indicated by the arrows in the drawings) without disruption of either web.

In a copending application Serial No. 668,106, filed Apr. 26, 1933, I have shown that when two or more non-conjointly creped sheets are cemented together, the composite fabric offers very much more resistance to the removal of stretch than if the sheets are uncemented. I explain this by pointing out that, upon stretching the composite fabric, the interposed adhesive, between the crinkles in the opposed sheets, is subjected at places to tensional stresses and in other places to compressional stresses transverse to the sheets. In resisting these stresses the adhesive effectively acts to resist the removal of stretch.

I have found that when two sheets of diagonally gathered materials in the relationship shown in Figure 1 are cemented together, there is inherent in the structure much more resistance to the removal of stretch along lines where stretching is possible than is present in two sheets of universally stretchable paper cemented together. This surprising property arises, I believe, from the action of the crinkles or gatherings in producing an additional distortion of the interposed adhesive. The lines of creping during sidewise or lengthwise stretching of the composite web tend to shift their angular positions with a sort of scissors action, or an action very much like the shifting of the relative directions of the warp and woof threads of a woven fabric when the woven fabric is stretched along the bias.

Both sheets have some degree of stretchability in all directions excepting a direction parallel to the lines of creping therein, so that within the limits of this stretchability there is no tendency to split or tear the webs which make up the composite fabric. In a bag made of such a fabric in which the lateral and longitudinal axes of the bag coincide with the lateral and longitudinal axes of the web, there would be no tendency to split either sheet under normal stresses, unless such stresses were applied diagonally of the bag and along the line of creping in one of the sheets. Even then, however, the other sheet would have stretchability in the direction of the stress and the bag would continue to be serviceable.

In bags in which serviceability arises from ability to absorb shocks and stresses by stretching or distortion, the greater the resistance to the removal of stretch, the better and more serviceable the bag, providing of course, the resistance to the removal of stretch is less than the ultimate strength of the bag walls.

For simplicity in the drawings I have omitted showing the adhesive, if used, as a separate layer. The adhesive used may be any desired. It may be an adhesive which has some resident plasticity at normal temperatures, like asphalt. It may be a resilient adhesive, like rubber. Even adhesives like silicate of soda or vegetable pastes, which tend to set to a rigid condition, will usually disintegrate or split when the web is stretched, thus permitting stretchability. When I speak of stretching, in composite fabrics or articles like those here under discussion, I include both stretching by permanent distortion and elastic or resilient stretching. It will be understood that a very little linear give in a small area of the composite web is multiplied many fold over the whole extent of the web.

In connection with my description of a product, bag or article such as is indicated by the showing of Fig. 1, I am not, of course, limited to creped paper but may employ paper characterized by other types of rugosities or gatherings such as corrugations, pleats, folds or the like. Also, as will be evident, the number of layers of paper in the composite fabric may be multiplied to any desired.

Figure 2:
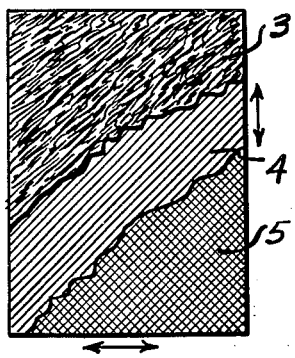

I have further found that with a fabric such as that illustrated in Fig. 1, where the web or the article made therefrom has inherent stretchability, universal stretchability or lateral and longitudinal stretchability, I can use a reenforcement, the elements of which are not in themselves substantially stretchable, by so arranging the reenforcing elements that the directions of desired stretchability in the web are not along the lines of the reenforcing elements. In Fig. 2 I have shown a composite fabric which may comprise a piece of creped paper 3, illustrated, for purposes of an exemplary disclosure, as a sheet of single-creped paper with the lines of creping running aslant both to the longitudinal and lateral axes of the web. I can impose on this web reenforcement members indicated at 4. These may, for example, be long, strong, tough fibers, such as fibers of sisal, or cords, threads or filaments. The diagonally disposed direction of these reenforcements leaves them free to move with reference to each other along the lateral and longitudinal axes of the web; therefore the reenforcing elements 4 do not interrupt the stretchability of the web in these directions. In view of these considerations, it is entirely possible and desirable in most instances to add another set of diagonally disposed reenforcing elements 5, crossing the first set but likewise disposed so as to permit stretchability along the longitudinal and lateral axes of the web.

The reenforcements may be applied to the paper in any desired way. Methods have been proposed in the past by treating a web of paper with diagonally disposed reenforcements; but unless the web of paper is stretchable in the same directions as the combined reenforcing structure is stretchable, a bag or similar article made of such a product would be subject to disruption of the paper web and therefore practically a failure in use, due to siftage and the like. However, it is not necessary that the direction of any set of reenforcements coincide exactly with the directions of the crinkles in the paper. It is desirable that there be a relatively small angular discrepancy between the two directions so that the paper will have a residue of stretchability in a direction along the line of a set of reenforcements such that the paper is somewhat more stretchable in this direction than the reenforcement elements themselves. Thus splitting of the paper may easily be avoided.

Figure 3:

In Fig. 2 I have illustrated the product as consisting of a sheet of paper 3, and crossing sets of reenforcing filaments, fibers or strands 4 and 5. It will be understood, of course, that an additional layer of paper may be placed over the reenforcing structure so that the reenforcement is sandwiched between layers of paper. Where the paper is single creped and more than one layer is used, it will be advantageous to have the direction of crinkles in the several paper layers disposed opposite to each other as taught in connection with Fig. 1. However, a fabric may be made with the reenforcing structure illustrated in Fig. 2, but with universally stretchable paper in the place of paper having but one direction of major or primary stretchability. Thus in Fig. 3 I have shown a web of paper 6 of universally stretchable character. This may be a double-diagonally creped paper made in accordance with the teachings of the Kemp application hereinabove referred to. On this sheet are laid the crossing layers of diagonally arranged reenforcements 4 and 5 and over the reenforcement is cemented another layer of universally stretchable paper 7.

By the use of reenforcement structures such as I have described, I have provided a bag or like article capable of absorbing shocks and strains by distortion in the useful directions; but at the same time I have been able to increase the ultimate bursting strength of the article, so that I secure, to all intents and purposes, the advantages of the ordinary paper-lined burlap bag in combination with the advantages of a type of bag in which shocks are met by distortion. This advantage cannot be secured in ordinary bags made of cloth because the warp and woof threads of the cloth follow the lateral and longitudinal axes of the bag or other article. If the warp and woof threads, however, could be caused to lie in substantially the same directions as the reenforcing elements 4 and 5 of the web of Figs. 2 and 3, the desired effect would be obtained. This can be done by cutting cloth on the bias, and in Fig. 4 I have indicated a composite fabric in which a sheet of paper 8 is joined to a bias cut web of cloth 9. The product of Fig. 4, of course, can likewise be faced on both sides with paper if desired.

Figure 4:
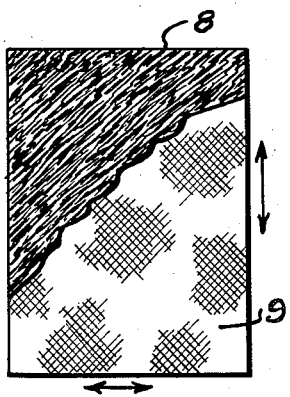
Figure 5:
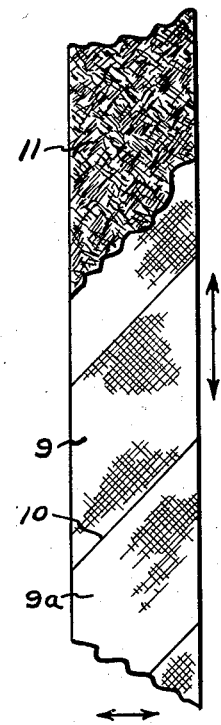

A fabric such as that shown in Fig. 4 can be made without substantial wastage by cutting cloth on the bias across a web so as to secure diamond shaped pieces, and then sewing these pieces together or otherwise joining them, in such a way as to form a new web, the warp and woof threads of which will lie essentially aslant to the lateral and longitudinal axes. I have illustrated this in Fig. 5 where a piece of bias cut cloth 9 is shown seamed as at 10, to another piece of bias cut cloth 9a. When such a web of cloth has been made, it may be surfaced continuously with paper as at 11. The paper may either be single-diagonally creped paper or universally stretchable paper. It will obscure any seams formed in the cloth and give a product having a unitary and continuous appearance.

Figure 6:
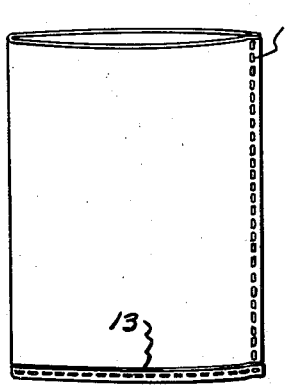
Figures 6 and 7 are plan views of completed bags before filling.

I have illustrated in Fig. 6 an exemplary form of bag in which a blank is folded over on itself, as shown, and a side and bottom seam formed. In this particular figure the side seam is shown as a plain, stitched seam at 12, and the bottom as a bound and sewn seam as at 13. Other types of seam formation as known in the art, are suitable for use with the fabrics of my invention.

Figure 7:
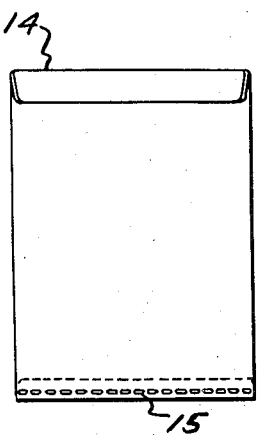

In Fig. 7 I have shown another type of bag having a sealing lip 14 at its ends, the bottom of the bag being shown as closed by a seam 15.

The various bag forms may be made from materials heretofore described, manufactured as sheets or webs. However, bag bodies in the form of tubes may also be made in accordance with the principles of my invention by tubing methods such as those illustrated in Figs. 9, 10 and 11.

I have illustrated in the first of these figures, a stationary mandrel 16 suitably supported so that one end of it is free. Paper from a supply roll or the like 17 may be tubed around this mandrel as shown. If the paper is creped by means of an adhesive such as rubber or asphalt, the coated side of the paper will be disposed outwardly on the mandrel; and if the paper is of such dimensions that it will lap when drawn around the mandrel, the rubber or asphalt will cement the edges together forming a seam. The edges may be otherwise treated to form a seam or merely left overlapping if desired. The paper now forms a tube 19 about the mandrel. Since the web of paper is led straight onto the mandrel, the paper will either be universally stretchable or will be diagonally gathered so as to be stretchable along its lateral and longitudinal axes. The reenforcement may be applied by a winding operation and to this end I have shown a pair of rotary members 20 and 21 bearing bobbins or spools 22 and 23. Cords, strands or filaments from these bobbins or spools may be laid against the tube while the rotary members 20 and 21 are rotated in opposite directions, whereby the strands will be laid on the tube in crossing layers and diagonally disposed with reference to the lateral and longitudinal axes of the tube. The cords may be braided about the paper covered mandrel, if desired.

Figure 8:
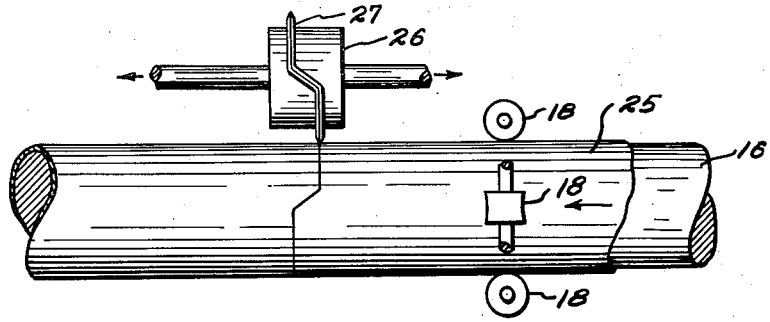
Figure 8 is a view of a mandrel and associated cutting device for forming the bag of Figure 7.
Figure 9:
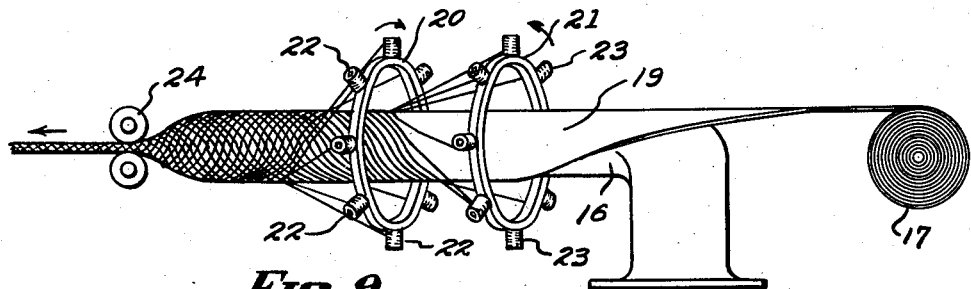
Figure 9 is a semi-diagrammatic view of an apparatus for making bag tubes.

In the making of an article reenforced by crossing strands, by the apparatus of Fig. 9 or otherwise, it is within the spirit of my invention to lock the strands, cords or filaments together where they cross so as to make the composite fabric act more nearly like a web of bias cut cloth. To this end it is competent to treat the cords or the like with rubber latex or other suitable adhesive which can be done in any way desired, as by passing cords through a bath of adhesive likewise rotating on the rotary members. If the cords or the like are laid while the adhesive is tacky, it will be clear that the strands will be locked together where they cross. The same adhesive may likewise be employed to fasten the strands to the paper, or a different adhesive may be employed for the latter purpose. In the operation as described in connection with Fig. 9, the paper may carry on its surface a coating of thermo-plastic or other adhesive such as rubber and this may serve to bind the reenforcing structure together. The finished tube coming off the end of the mandrel is flattened as by means of rolls 24 and can be cut apart into bag blanks. It will be clear that another layer of paper can be tubed about the reenforcement so as to give a bag tube in which the reenforcement is sandwiched between layers of paper if this be desired. Either or both of the layers of paper may have the characteristic of universal stretchability or either or both may be of paper which is single creped, but creped along a diagonal, and if single-diagonally creped paper is used, the crinkles in the two layers are preferably opposed in direction as aforesaid.

Where it is desired to form a bag characterized by a lip, as illustrated at 14 in Fig. 7, the bag tube may be cut apart while still on the mandrel by a suitably shaped cutter. In Fig. 8 I have illustrated on the mandrel 16, a finished tubed structure 25. A rotary cutter 26 having a cutting edge 27 suitably shaped to make lips on the bag blanks is mounted in a rotary carriage so that it can cut the material circumferentially around the mandrel and against the mandrel. The cutter is also caused to travel in the carriage longitudinally of the mandrel at the same speed as the traveling tube. This cutting device is also applicable to the processes and devices hereinafter described.

Figure 10:
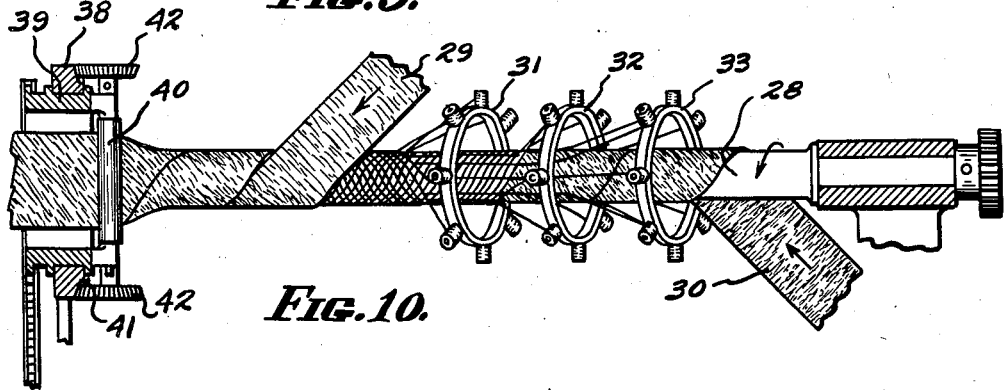
Figure 10 is a partial and semi-diagrammatic view of another type of apparatus for making bag tubes, this apparatus involving a rotating mandrel.

In Fig. 10 I have illustrated still another type of apparatus, in this instance employing a rotary mandrel 28. Webs of paper 29 and 30 may be laid diagonally against this mandrel and wound up thereon in overlying layers, as is done in the manufacture of mailing tubes, for example. Between the points where the two layers of paper are led onto the mandrel, I have shown a plurality of strand applying devices 31, 32 and 33 of the general type heretofore described in connection with Fig. 9. A pair of these devices at least, will be so rotated as to have effectively opposite directions of application of the filaments. Since the mandrel 28 is rotating in this instance, this may mean that the rotary mechanisms rotate in the same direction as respects an external point, but one of them rotates faster and the other slower than the mandrel. The two effectively oppositely rotated mechanisms apply a reenforcement of crossed strands or the like, as hereinabove described. A third one of the mechanisms may be caused to rotate at exactly the same speed as the mandrel 28 so as to apply straight longitudinal reenforcements to the tube. This, if done, will usually be for the purpose of assisting in the withdrawal of the tube from the mandrel. Strong longitudinal cords will increase the longitudinal strength of the bag at the expense of longitudinal stretchability. These cords, fibres, or the like may, however, be proportioned in strength so that, while they assist in the withdrawal of the tube they will break in the bag under the strains of use, thus restoring stretchability.

The mandrel may likewise be tapered toward the withdrawing end to facilitate removal of the tube.

The withdrawal of the tube may be effected, if desired, by rotating pull rolls (18, in Fig. 8).

The helical winding of a web constitutes a way of securing in a finished tubed body, a diagonal disposition of filaments, which in the web would lie along the transverse axis. Thus instead of cutting a web of cloth along the bias and then sewing the bias cut portions together, it is possible to gain the same effect in a tubing operation by helically winding a web of cloth about a mandrel in such a way that in the finished tube, the warp and woof threads of the cloth lie aslant to the longitudinal and lateral axes of the tube. The cloth may be so applied that its edges overlap, and any suitable seam formed therein.

Likewise in the formation of a web having the functions of the webs hereinabove described, it will be possible to employ ordinary creped paper, i. e. creped paper having lines of creping parallel to the transverse axis of the web. This can be done by winding the paper helically about a mandrel in such a way that in the finished tube, the direction of the lines of creping is aslant to both axes of the tube.

Where the web of Fig. 1, however, is to be made in tube like form by such a method, in view of the fact that it is desired to have the direction of the lines of crepe in the two layers of paper oppositely disposed, it will be necessary to wind the two paper layers of the tube in effectively opposite directions. This can be done by providing a mandrel such as the mandrel 34 in Fig. 11 which is fixed and non-rotatable and then mounting the supply rolls of paper or other web material on rotating members surrounding the mandrel as illustrated, and causing these members to rotate, whereby the material is wound on the mandrel. Thus in Fig. 11, webs 35 and 36 may be ordinary creped paper webs, having the layers of creping crinkles parallel with the transverse axis of the web. They are shown as being wound around the mandrel in effectively opposite directions. If this is done alone, a tube will be formed in which the fabric has the characteristics of the product of Fig. 1. A third web 37 may be wound around the mandrel intermediate the other two webs. This web may be a web of cloth and the resulting product will be a product like that shown in Fig. 4, but with another layer of creped paper added above the bias laid cloth.

Figure 11:
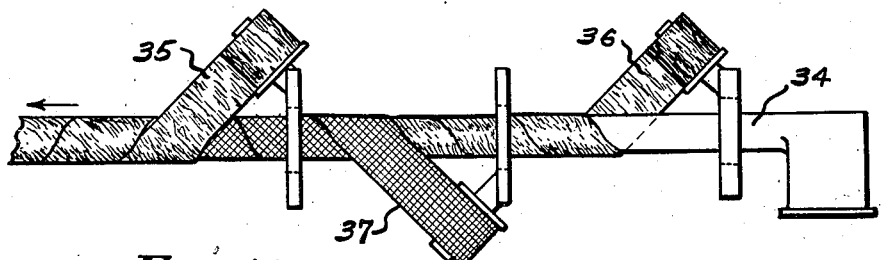
Figure 11 is a partial and semi-diagrammatic view of an apparatus for making still another kind of bag tube.

In Fig. 11 however, if the webs 35 and 36 are webs of universally stretchable paper, then the supply rolls may be mounted upon stationary supports and the mandrel rotated as taught in Fig. 10. This will give a product which, with respect to the longitudinal and lateral axes of the tube consists of a layer of bias cloth disposed between layers of universally stretchable paper.

Again when using an apparatus like that of Fig. 9, it is possible to tube universally stretchable paper webs or diagonally gathered paper in a straight-away manner, then helically wind burlap or the like about it by mounting the burlap supply roll in a rotating stand as illustrated in Fig. 11, and carrying it about the mandrel so as helically to wind the burlap thereon.

The cut-off mechanism hereinabove described may be employed with any of the mandrel machines. Where the mandrel itself rotates, of course, it is not necessary to carry the cut-off mechanism around the mandrel. It will be clear that wherever the cut-off mechanism is employed, it eliminates the possibility of pulling on a continuous tube beyond the end of the mandrel. Therefore feeding means will be employed in connection with the mandrel, such as the power driven rolls 18 of Fig. 8.

Where no cut-off mechanism is employed, pull rolls beyond the end of the mandrel may be used to remove the tube from the mandrel. Such rolls have been shown at 24 in Fig. 9. If the tube is rotating as it leaves the mandrel, rotating pull rolls may be installed. One such installation is illustrated in Fig. 10, and comprises a stand 38, a member 39 rotatable in the stand, and pull rolls 40 journaled in the member. The stand is provided with a ring gear 41 and a pinion 42 on each of the pinch rolls meshes with this gear. Thus as the member is driven, the pinch rolls are caused to rotate; and by reason of the rotation of the member they turn on a transverse axis. The matter of timing and adjustment will be within the skill of the mechanic.

A fabric such as that shown in Figure 1 can be made otherwise than by the superposition of separate webs or sheets of paper having diagonal crepes. Thus a length of single-diagonally-creped paper may be folded over on itself lengthwise, and in the superposed layers thus formed the crinkles will be oppositely directed. Also a web of single-diagonally-creped material may be folded over widthwise on itself to gain the same effect; and this may be done continuously. Other materials may be interleaved between the layers, such as reinforcements, cloth, panel materials, insulation materials and the like. The use of two sheets or webs, or a single sheet or web folded over on itself, with a material interleaved therebetween but not coextensive with the sheets or webs, is an excellent way of making a sheathed article with projecting, double-stretch flanges, e. g. an insulation assembly with attachment flanges.

The webs hereinabove described are useful for the manufacture of other articles than bags and in general are useful wherever a web of material is desired having stretchability, both along its longitudinal and lateral axes. Such fabric may be coated with lacquers, resins, cellulosic compounds or the like for the production of artificial leathers and decorative materials; they can be printed or otherwise decorated. They can be embossed. Where the tubing methods described are found to be more convenient or cheaper, but where the resultant material is desired in sheet form, it will be clear that the tubes may be slit and the material rolled up into one or more rolls.

The material is likewise useful for binding strips and the like, particularly for binding around corners, etc., and in connection with sealing strips for bags, it will be clear that a/ bag may be formed with wall portions of which some at least are not stretchable laterally and longitudinally, but portions of which are stretchable in these directions. Such a bag will have some degree of resistance to stresses of use due to the distortability of the stretchable portions.

In a copending application, Serial No. 135,295, filed April 6, 1937, I have disclosed the inclusion, in bags or other flexible containers made of composite webs, of films such as films of cellulosic compositions, rubber derivatives and the like. It will be understood that these teachings are applicable to the webs and articles made therefrom which are herein described, and also that films may be employed in the tubing methods and with the apparatus set forth in this disclosure.

Finally it may be noted that in containers of the expansible type the precautions ordinarily necessary in seam formation are not required. Where in ordinary paper-lined burlap, for example, cemented seams are to be made, the seam should have a strength equal to the ultimate strength of the container walls, if premature seam failure is not to occur, wherefore it has been necessary to adopt a seam construction which permitted the cementing of cloth directly to cloth. This is not necessary in my expansible containers, since, so long as there is resident expansibility in the container walls, the strain is not localized at the seam construction. Thus excellent containers may be made by lapping and cementing the fabric, though this result in a paper-to-paper bond or a paper-to-cloth bond.

Modifications may be made in my invention without departing from the spirit of it.

Having thus described my invention, what I claim as new and desire to secure by Letters Patent is:

1. A process of making a tube structure which comprises tubing a stretchable paper in such a way that the tube so formed is stretchable laterally and longitudinally and winding about the tube so formed reinforcing strands in such manner that the direction of the reinforcing strands in the finished product is aslant to the lateral and longitudinal axes thereof.

2. A process of making laterally and longitudinally stretchable tubes from universally stretchable paper characterized by crossing sets of rugosities imparting stretchability, which comprises winding said paper helically to form said tube so that in the final tube the rugosities imparting stretchability to said paper lie aslant to the axes of said tube.

3. A process of producing a tube stretchable along its lateral and longitudinal axes which comprises tubing a stretchable paper web and helically winding about said tube a layer of cloth so that in the final tubed structure the warp and woof threads of said cloth lie aslant to the longitudinal and lateral axes of said tube.

4. A process of making a tube structure which comprises tubing and longitudinally center seaming a length of paper which has been treated to render it universally stretchable, and winding about the tube so formed, reinforcing strands in such manner that the direction of the reinforcing strands in the finished tube is aslant to the lateral and longitudinal axes thereof.

5. A process of making a tube structure which comprises helically winding stretchable paper about a mandrel so as to form a tube and winding about the tube so formed, reinforcing strands in such manner that the direction of the reinforcing strands in the finished product is aslant to the lateral and longitudinal axes thereof.

6. A process of making a tube structure which comprises helically winding stretchable paper about a mandrel so as to form a tube and winding about the tube so formed, reinforcing strands in such manner that the direction of the reinforcing strands in the finished product is aslant to the lateral and longitudinal axes thereof, said paper being characterized by creping crinkles lying perpendicular to its longitudinal axis, whereby when said paper is helically wound, the direction of the crinkles in the finished product will lie aslant to the lateral and longitudinal axes thereof.

7. A process of making a tube structure which comprises helically winding stretchable paper about a mandrel so as to form a tube and winding about the tube so formed, reinforcing strands in such manner that the direction of the reinforcing strands in the finished product is aslant to the lateral and longitudinal axes thereof, said paper being characterized by creping crinkles lying perpendicular to its longitudinal axis, whereby when said paper is helically wound, the direction of the crinkles in the finished product will lie aslant to the lateral and longitudinal axes thereof, and afterward winding helically upon said tube, paper creped transversely to its major axis in such a way that the crinkles of said paper also lie aslant to the lateral and longitudinal axes of the tube so formed.

8. A process of making a tube structure which comprises helically winding stretchable paper about a mandrel so as to form a tube and winding about the tube so formed, reinforcing strands in such manner that the direction of the reinforcing strands in the finished product is aslant to the lateral and longitudinal axes thereof, said paper being characterized by creping crinkles lying perpendicular to its longitudinal axis, whereby when said paper is helically wound, the direction of the crinkles in the finished product will lie aslant to the lateral and longitudinal axes thereof, and afterward winding helically upon said tube, paper creped transversely to its major axis in such a way that the crinkles of said paper also lie aslant to the lateral and longitudinal axes of the tube so formed, and are oppositely directed with respect to the crinkles in the first-mentioned paper layer.

9. A process of forming tubes for bags or the like which comprises tubing paper creped by means of an adhesive and bearing said adhesive on its surface, the said tube being formed with the adhesive surface outwardly disposed, winding strands on the tube so formed so that in the finished product the strands lie aslant to the lateral and longitudinal axes thereof, the said strands contacting and adhering to the said layer of adhesive.

10. A process of forming tubes for bags or the like which comprises tubing paper creped by means of an adhesive and bearing said adhesive on its surface, the said tube being formed with the adhesive surface outwardly disposed, winding strands on the tube so formed so that in the finished product the strands lie aslant to the lateral and longitudinal axes thereof, the said strands contacting and adhering to the said layer of adhesive, and tubing about the tube so formed, another layer of paper creped by means of a positive adhesive with the adhesive on said paper disposed inwardly and against said strands.

11. A process of producing a tube stretchable along its lateral and longitudinal axes, which comprises tubing a stretchable paper and helically winding about said tube a layer of cloth so that in the final tube, the warp and woof threads of said cloth lie aslant to the longitudinal and lateral axes of said tube, and tubing a second layer of paper over said helically wound cloth, adhesively securing said cloth and paper layers together.

12. A process of producing a tube which comprises helically winding paper creped substantially perpendicular to its major axis, so as to secure a paper tube in which the crinkles lie in a helical direction, winding about said tube a layer of cloth so that in the final tubed structure the warp and woof threads of said cloth lie aslant to the longitudinal and lateral axes of said tube, then winding helically about said cloth layer, a second layer of paper creped substantially perpendicularly to its normal axis in such a way as to dispose the creping crinkles thereof helically in said tube, but opposite to the creping crinkles in the first-mentioned paper layer.

13. A process of making a tube structure which comprises tubing a stretchable paper in such a way that the tube so formed is stretchable laterally and longitudinally, and winding about the tube so formed reinforcing strands in such manner that the direction of the reinforcing strands in the finished product is aslant to the lateral and longitudinal axes thereof, and afterward cutting said tube apart into tubular bag blanks by a line of cut which, for a portion of the circumference of said tube has a different axial position from that which it occupies in the other portion of said circumference whereby to form a blank having a sealing lip.

14. A process of making a tube structure which comprises tubing a stretchable paper about a mandrel in such a way that the tube so formed is stretchable laterally and longitudinally, and winding about the tube so formed, individual reinforcing strands in opposite directions in such manner that the direction of the reinforcing strands in the finished product is aslant to the lateral and longitudinal axes thereof, and prior to said winding, treating said strands with an adhesive substance so as to lock the strands to each other at the points where they cross on the tube.

15. A process of making a tube structure which comprises tubing a stretchable paper about a mandrel in such a way that the tube so formed is stretchable laterally and longitudinally, and winding about the tube so formed reinforcing strands in such manner that the direction of the reinforcing strands in the finished product is aslant to the lateral and longitudinal axis thereof, and incorporating in the tube strands parallel to the longitudinal axis thereof to assist in removing said tube from said mandrel.

WILLIAM WALLACE ROWE.